(12) United States Patent
Subramoney et al.

(10) Patent No.: US 10,013,352 B2
(45) Date of Patent: Jul. 3, 2018

(54) PARTNER-AWARE VIRTUAL MICROSECTORING FOR SECTORED CACHE ARCHITECTURES

(71) Applicant: Intel Corporation, Santa Clara, CA (US)

(72) Inventors: Sreenivas Subramoney, Bangalore (IN); Jayesh Gaur, Bangalore (IN); Mukesh Agrawal, Durham, NC (US); Mainak Chaudhuri, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,963

(22) Filed: Sep. 26, 2014

(65) Prior Publication Data

US 2016/0092369 A1    Mar. 31, 2016

(51) Int. Cl.
*G06F 12/12* (2016.01)
*G06F 12/0811* (2016.01)
*G06F 12/0813* (2016.01)
*G06F 12/0842* (2016.01)
*G06F 12/123* (2016.01)

(52) U.S. Cl.
CPC ...... *G06F 12/0811* (2013.01); *G06F 12/0813* (2013.01); *G06F 12/0842* (2013.01); *G06F 12/123* (2013.01); *G06F 2212/1024* (2013.01); *G06F 2212/1056* (2013.01); *G06F 2212/3042* (2013.01)

(58) Field of Classification Search
CPC ........ G06F 12/00–12/16; G06F 12/12–12/128
See application file for complete search history.

(56) References Cited

U.S. PATENT DOCUMENTS

| 5,428,565 | A  | * | 6/1995  | Shaw ..................... G11C 15/04 |
|           |    |   |         | 365/189.04                            |
| 6,823,427 | B1 | * | 11/2004 | Sander ................ G06F 12/0864 |
|           |    |   |         | 711/118                               |
| 2005/0102486 | A1 | * | 5/2005  | Lakshmanamurthy et al. .. 712/1 |
| 2005/0216691 | A1 | * | 9/2005  | Michael ............... G06F 12/023 |
|           |    |   |         | 711/170                               |
| 2009/0049248 | A1 | * | 2/2009  | Clark .................. G06F 12/0851 |
|           |    |   |         | 711/129                               |
| 2009/0063818 | A1 | * | 3/2009  | Gschwind et al. ........... 712/204 |
| 2009/0094418 | A1 | * | 4/2009  | Warner ................ G06F 12/082 |
|           |    |   |         | 711/144                               |
| 2009/0106496 | A1 | * | 4/2009  | Knebel ............... G06F 12/0862 |
|           |    |   |         | 711/136                               |
| 2009/0222636 | A1 | * | 9/2009  | Yano et al. ................... 711/166 |
| 2011/0078381 | A1 | * | 3/2011  | Heinrich ............. G06F 12/0842 |
|           |    |   |         | 711/122                               |
| 2012/0317361 | A1 | * | 12/2012 | Solihin ......................... 711/128 |
| 2014/0189243 | A1 | * | 7/2014  | Cuesta et al. ................. 711/128 |
| 2015/0113214 | A1 | * | 4/2015  | Sutardja ........................ 711/106 |

* cited by examiner

*Primary Examiner* — Nicholas Simonetti
(74) *Attorney, Agent, or Firm* — Nicholson DeVos Webster & Elliott LLP

(57) ABSTRACT

Embodiments described include systems, apparatuses, and methods using sectored dynamic random access memory (DRAM) cache. An exemplary apparatus may include at least one hardware processor core and a sectored dynamic random access (DRAM) cache coupled to the at least one hardware processor core.

17 Claims, 16 Drawing Sheets

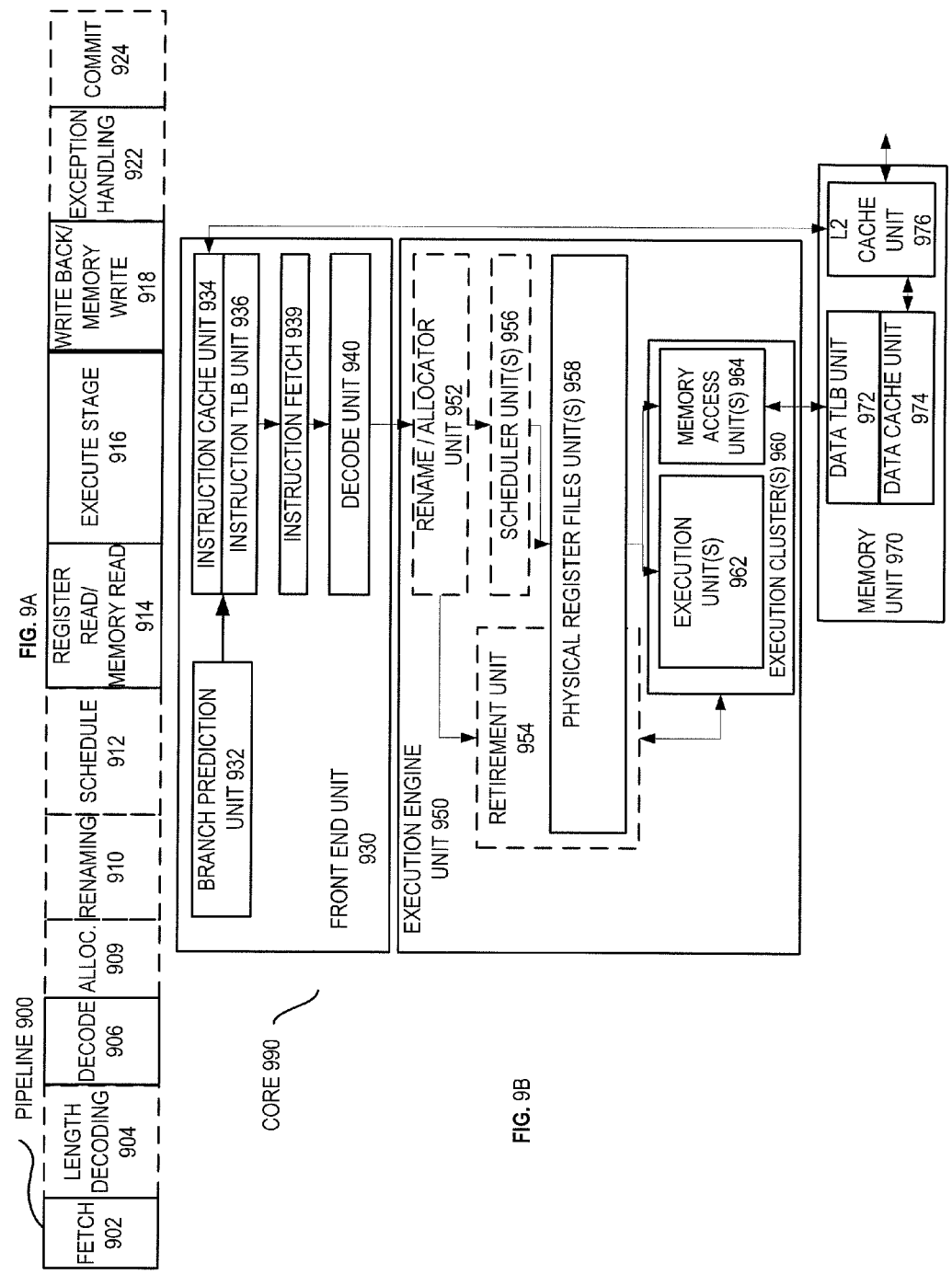

PARTNER-AWARE VIRTUAL MICROSECTORING FOR SECTORED CACHE ARCHITECTURES

FIELD OF INVENTION

The field of invention relates generally to computer processor architecture, and, more specifically, sectored caches.

BACKGROUND

DRAM caches are increasingly becoming the preferred choice for architecting high-capacity last-level caches in high-end computing systems. Recent research proposals on DRAM cache architectures have explored designs with conventional block sizes (64 or 128 bytes) as well as large page-sized blocks. These two classes of designs respectively focus on minimizing the space/latency impact of the tag store and maximizing the effective utilization of the main memory bandwidth.

BRIEF DESCRIPTION OF THE DRAWINGS

The present invention is illustrated by way of example and not limitation in the figures of the accompanying drawings, in which like references indicate similar elements and in which:

FIGS. 9A-B are block diagrams illustrating both an exemplary in-order pipeline and an exemplary register renaming, out-of-order issue/execution pipeline according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Detailed below are systems, methods, and apparatuses that utilize sectored DRAM caches to enable reasonably small on-die SRAM tag/state and minimize main memory bandwidth wastage. However, the sectored caches are known to suffer from low hit rates due to poor utilization of the cache space.

Figure 1:
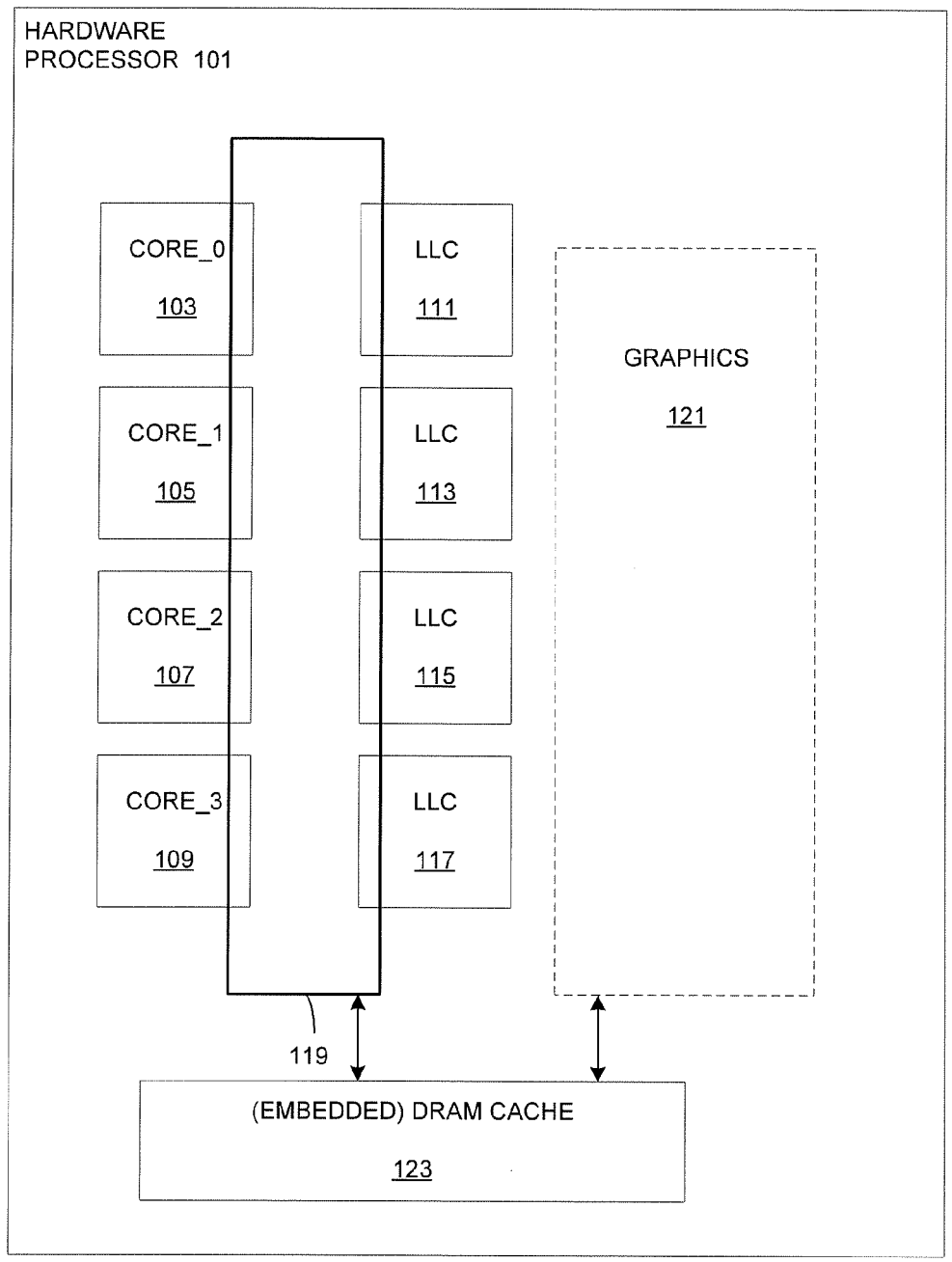
FIG. 1 illustrates an embodiment of an exemplary hardware processor that utilizes sectored caches.

FIG. 1 illustrates an embodiment of an exemplary hardware processor that utilizes sectored caches. The processor 101 includes a plurality of hardware cores 103-109. In some embodiments, each core includes 32 KB 8-way instruction and data L1 caches and a 256 KB 8-way unified L2 cache. Further, each core may include with a global history buffer-based constant stride prefetcher. Prefetch requests are injected on L1 data cache misses and the prefetched blocks are filled all the way down to the L1 data cache. The prefetcher can hide a sizable portion of the DRAM cache access latency.

A last-level cache (LLC), such as an L3 cache, is accessible to each core 103-109. In the illustrated embodiment, the LLC is split into different slices 111-117 with each slice accessible by the cores through a ring 119.

In some embodiments, a graphics processor or other accelerator 121 is included in the hardware processor 101. This graphics processor or other accelerator 121 may share access to the LLC with the cores 103-109.

Additionally, in some embodiments, the hardware processor 101 includes a decoupled sectored DRAM cache 123 on-die (making this an embedded DRAM cache). However, in other embodiments the DRAM cache 123 is located off-die. Typically, the DRAM cache 123 is shared between the cores 103-109 and accelerators 121 of the processor 101. The DRAM cache 123 is the high level in the processor's 123 cache hierarchy (for example, it is L4). In most embodiments, the DRAM cache 123 is non-inclusive with respect to the LLC (an eviction from the L4 cache does not send invalidation to the LLC cache) and shared by all cores. Dirty evictions from the LLC cache are sent to the DRAM cache 123 which allocates a block for a write miss. Compared to the main memory DRAM, the sectored DRAM cache 123 has many times the bandwidth and less latency for precharge, activate (row-to-column delay), and column access. Not shown in this illustration is storage for tags associated with the sectored DRAM cache 123. This storage may be on-die with the DRAM cache 123, or as a part of either one or more of the cores 103-109 and/or a centralized storage location accessible by each of the cores 103-109 but not on the same die as the DRA cache 123.

Typically, a sectored cache is organized as a set-associative cache as a collection of sets and ways, with each way being allocated to an entire sector. Sectored (or sub-blocked) caches use relatively large allocation units called sectors typically ranging in size from 512 bytes to 8 KB. In most embodiments, each sector is composed of a number of contiguous conventionally-sized cache blocks. For example, a 2 KB sector could be designed as a collection of 32 contiguous cache blocks each of size 64 bytes. The amount of data fetched from main memory on a demand miss is usually a cache block. As a result, the cache blocks filled into the sectored cache are guaranteed to experience at least one use. In a sectored DRAM cache, a sector is allocated contiguously in the DRAM pages leading to high DRAM page hit rate in the presence of good spatial locality. Since the allocation unit in a sectored cache is a sector, only one tag needs to be maintained per sector along with a state vector to record the states of the constituent cache blocks (e.g., valid/occupied and dirty). Additionally, each sector maintains replacement state bits required for carrying out sector replacement.

While sectored caches offer an attractive design choice for architecting DRAM caches, they often suffer from poor performance due to low utilization of the sectors arising from the unoccupied cache blocks in a sector.

Figure 2:
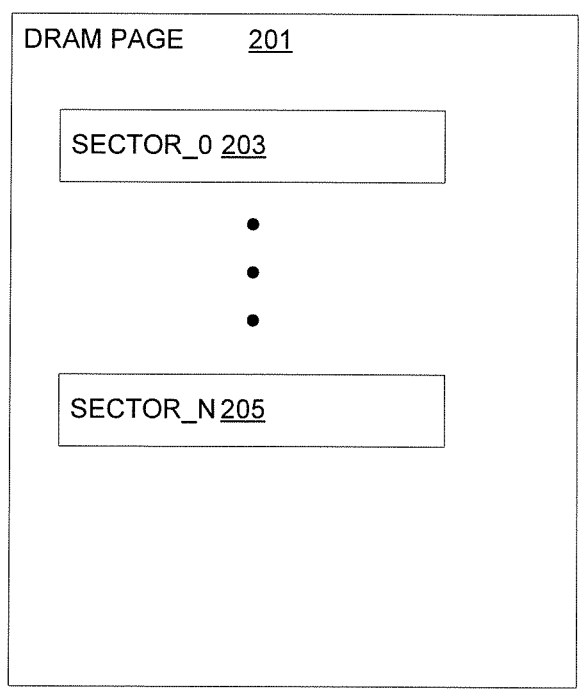
FIG. 2 illustrates an example of a DRAM cache page with a plurality of sectors.

FIG. 2 illustrates an example of a DRAM cache page with a plurality of sectors. In this example, the DRAM cache page 201 includes N sectors 203 to 205. As noted above, each sector of the sectored DRAM cache page is a collection of consecutive cache lines.

Figure 3:
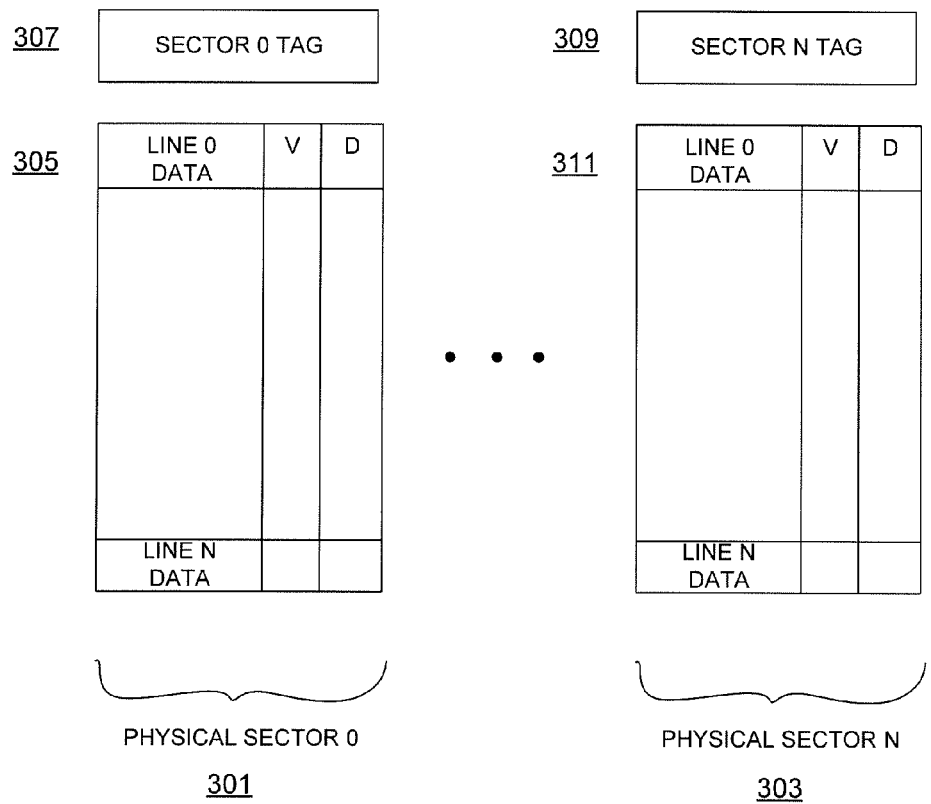
FIG. 3 illustrates an example of sectored cache that utilizes sector tags.

FIG. 3 illustrates an example of sectored cache that utilizes sector tags. Each physical sector 301 to 303 includes a plurality of lines such as lines 305 and 311. Each line includes data and may include valid and/or dirty bits (V and D in the illustration). The valid and/or dirty bits may alternatively be stored in a different data structure.

Associated with each physical sector 303 to 303 is a sector tag 307 to 309. Sector tags are used by an accessing unit (core, memory controller, etc.) as a part of an address of the physical sector. Typically, these tags are on-die, but not stored inside the sectored DRAM cache. For example, these tags may be stored in one or more cores, or in a central location accessible by the cores. Having these tags on-die allows for less latency in determining if a cache access is a hit or miss. However, in some embodiments, the sector tags 307 to 309 are stored inside the DRAM cache.

Figure 4:
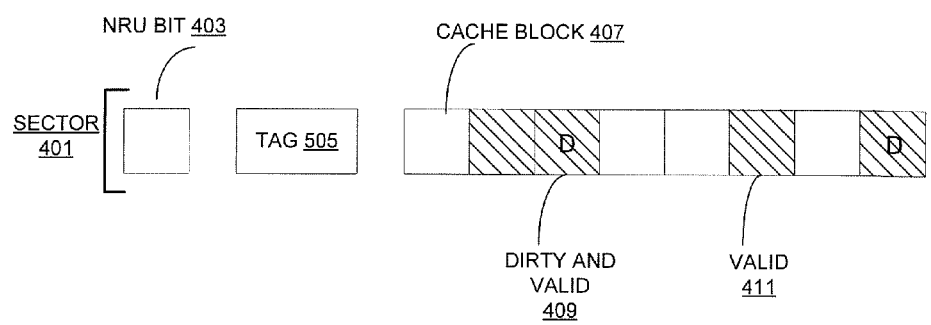
FIG. 4 illustrates an embodiment of a sector.

FIG. 4 illustrates an embodiment of a 512-byte sector 401 composed of eight 64-byte cache blocks 407, four of which are occupied (marked with a hash and called "valid"). Two of the occupied blocks are dirty (marked "D"). The sector tag 305, the not-recently-used (NRU) replacement bit 403, and the valid and dirty blocks (409 and 411) are also shown.

Figure 5:
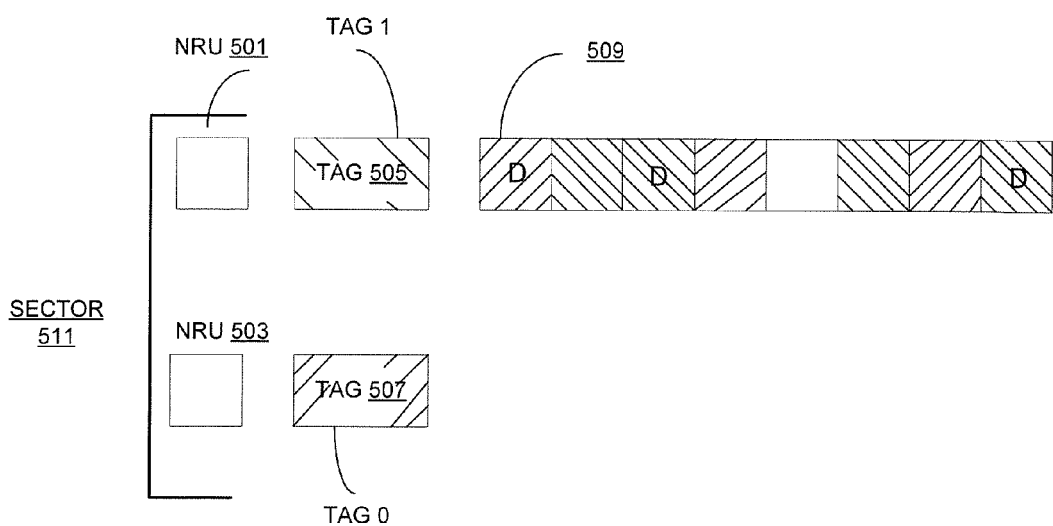
FIG. 5 shows a physical sector with two sectors multiplexed onto it.

An n-way set-associative sectored cache would have n such sectors in each cache set. FIG. 5 shows a physical sector 511 (e.g., a 512-byte sector) with two sectors multiplexed onto it (in other words, two sectors 0 and 1 share the same physical sector). In this simple illustration, the physical sector 501 is multiplexed in two ways. There is a NRU bit (301 and 503) and tag (305 and 505) per sector. The physical cache blocks 509 show the mapping of these sectors (sector 1 is mapped to blocks 2, 3, 5, and 7, and sector 0 is mapped to blocks 0, 3, and 6). Each cache block position of the physical sector maintains $\log_2(N)$ bits indicating which one of the multiplexed sectors it belongs to, where N is the degree of multiplexing. Additionally, each physical sector maintains N sector tags 503 and 505 and associated NRU bits (not shown).

In an n-way decoupled sectored cache, when a sector needs to be filled into a set, the global NRU sector among all the N*n sectors mapped to that set is identified and the new sector tag occupies the position of this global NRU tag. Suppose the global NRU sector is mapped to physical sector s. All cache blocks belonging to the global NRU sector s are replaced from physical sector s. Further, suppose that the requested cache block is at position k of the new sector. The requested cache block is filled into position k of physical sector s. This may require replacing the block at position k of physical sector s, if that position is still occupied. Since the tag/state SRAM size of the decoupled sectored cache increases with the degree of multiplexing, we confine our exploration to the architectures that multiplex only two sectors onto a physical sector frame.

Unfortunately, decoupled sectored caches often suffer from high levels of conflicts when two sectors with reasonably high sector utilization get multiplexed onto the same physical sector. In this scenario, each cache block position of the physical sector would be contended by two cache blocks from the two multiplexed sectors and it is very likely that these two cache blocks would thrash (conflict) each other hurting the overall hit rate.

To help alleviate these drawbacks, within each sector, a coarse-grain allocation unit called micro-sector may be utilized. A micro-sector is a contiguous region of a sector comprising one or more consecutive cache blocks that represents the minimum granularity of a fill and ownership within the sectored cache. For example, a 1 KB sector would have four 256-byte micro-sectors. The first four cache blocks form the first micro-sector, the next four cache blocks form the second micro-sector, and so on. In a decoupled sectored cache, when a cache block belonging to one of the multiplexed sectors is filled into the host physical sector frame, a full micro-sector is reserved for that sector. The flexibility in the mapping scheme comes from the fact that this micro-sector can be allocated in any of the micro-sectors of the physical sector frame.

As an example, consider a decoupled sectored cache with 1 KB sectors and 256-byte micro-sectors. There are four possible micro-sector mapping positions in each physical sector frame. Each sector has sixteen cache blocks numbered 0 to 15. Consider a completely unoccupied physical sector frame P. The first access to a sector $S_1$ requests cache block number 7 of that sector. This cache block belongs to the second micro-sector (containing cache blocks 4, 5, 6, 7) of sector $S_1$. When the requested cache block is filled into P, the first micro-sector of P is reserved for the second micro-sector of $S_1$. Next, suppose another access from some other sector $S_2$ mapping to the same physical sector P requests cache block 7 of sector $S_2$. This cache block belongs to the second micro-sector (containing cache blocks 4, 5, 6, 7) of sector $S_2$. The tag of $S_2$ is allocated in the second tag of P and when the requested cache block is filled into P, the second micro-sector of P is reserved for the second micro-sector of $S_2$. It is important to observe that in the baseline decoupled sectored cache this fill would have conflicted with the earlier fill from sector $S_1$. In general, a filling cache block first finds out if its micro-sector has already been allocated. If yes, it just fills at the appropriate offset within the micro-sector. For instance, in the above example, a subsequent request to cache block 5 of sector $S_1$ would not allocate a new micro-sector, but fill the cache block at the second cache block position within the first micro-sector of P. If a filling cache block needs to allocate a new micro-sector, it first looks for an unoccupied micro-sector in the physical sector frame; if none exists, a micro-sector replacement needs to be carried out.

The storage space for tag/state in a design exercising micro-sectors includes the two tags discussed above, their NRU bits, the valid vector and the dirty vector per physical sector frame. Instead of a membership bit per cache block, now a membership bit per micro-sector of the physical sector frame is added. This bit indicates which of the two sectors a particular physical micro-sector belongs to and is a "virtual sector tag." A virtual sector allows a physical micro-sector to be shared. Each logical micro-sector of a given virtual sector may occupy any physical micro-sector.

Figure 6:
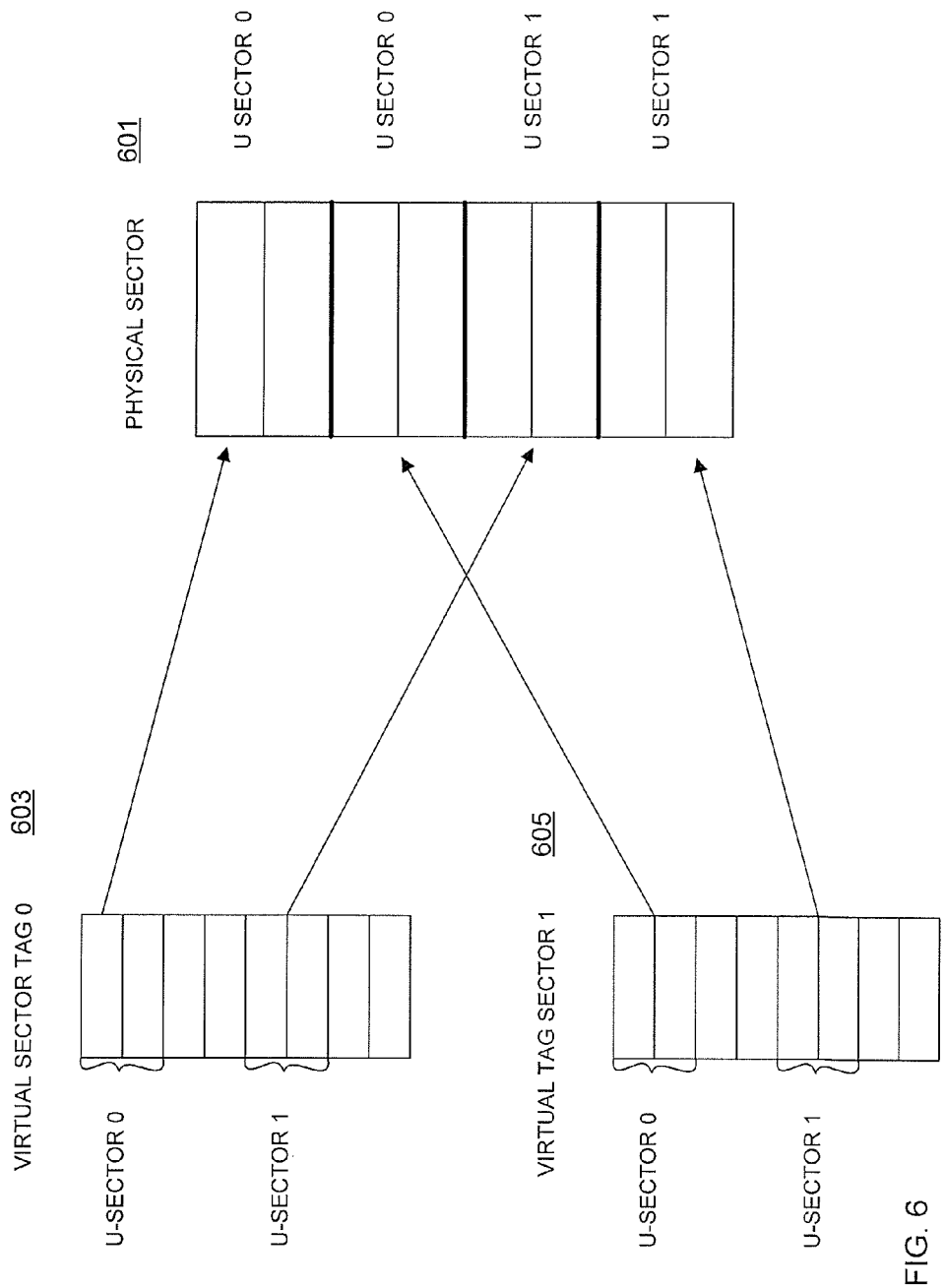
FIG. 6 illustrates an example of a virtual sector tag usage.

A thrash (or conflict) happens when an existing virtual sector that is using a physical micro-sector needs to be potentially evicted by a newly allocated virtual sector partner in the same way. This can be alleviated through flexible micro-sector allocation. FIG. 6 illustrates an example of a virtual sector tag usage. In this example, the physical sector 601 includes a plurality of physical micro-sectors (micro-sectors 0-3). The virtual sector tags 603 and 605 dictate that virtual micro-sectors 0 and 2 of virtual sector tag 603 occupy physical micro-sectors 1 and 3 of the physical sector while avoiding thrashing with virtual micro-sectors 0 and 2 of virtual sector tag 605.

Additionally, each physical micro-sector maintains $\log_2(N)$ bits indicating its actual position within its parent sector, where N is the number of micro-sectors in a sector. In summary, assuming K cache blocks per sector, the K-bit membership vector of the baseline decoupled sector gets replaced by $N+N \log_2(N)$ bits of micro-sector membership vector and micro-sector location vector. Therefore, if N is chosen such that $N+N \log_2(N) < K$ with $2 \leq N \leq K$, the overall tag/state SRAM storage can be less than the baseline decoupled sectored cache.

Figure 7:
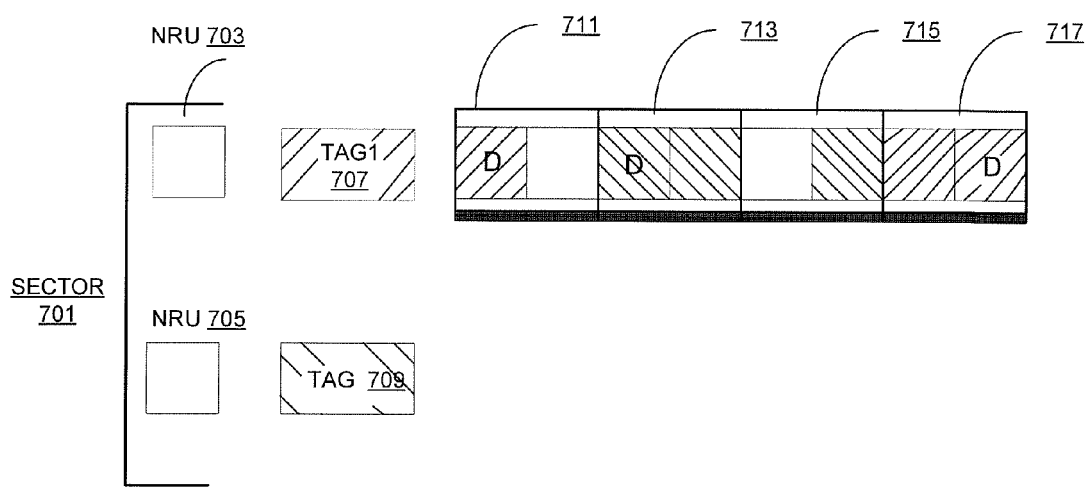
FIG. 7 shows a sector implementing micro-sectors.

FIG. 7 shows a 512-byte sector 701 implementing 128-byte micro-sectors 711-717). The four micro-sectors are shown with bold lines. All the micro-sectors are occupied (as can be inferred from the valid vector). In this example, virtual TAG0 707 and TAG1 709 correspond to sectors $S_0$ and $S_1$. Let the four micro-sectors in each sector be numbered zero to three. The sector tags are viewed as membership vector (1001) that indicates that the first and the last micro-sectors belong to $S_1$, while the middle two micro-sectors belong to $S_0$. A location vector (11010000) is interpreted as follows. The first two bits indicate the position of the first physical micro-sector within its parent sector, the next two bits indicate the position of the second physical micro-sector within its parent sector, and so on. In this example, the first physical micro-sector is micro-sector number three in $S_1$, the second physical micro-sector is micro-sector number one in $S_0$, the third physical micro-sector is micro-sector number zero in $S_0$, and the last physical micro-sector is micro-sector number zero in $S_1$.

Instead of maintaining an NRU bit 703, 705 with each tag (i.e., two NRU bits per physical sector frame), an NRU bit is maintained with each physical sector frame. Within each physical sector frame, another bit is used to record which of the two multiplexed tags is the NRU tag. The sector replacement algorithm detailed below first selects the NRU physical sector frame within a set. It is guaranteed that none of the two sectors multiplexed onto this physical sector frame is recently accessed. Within this physical sector frame, the NRU sector is replaced.

Figure 8:
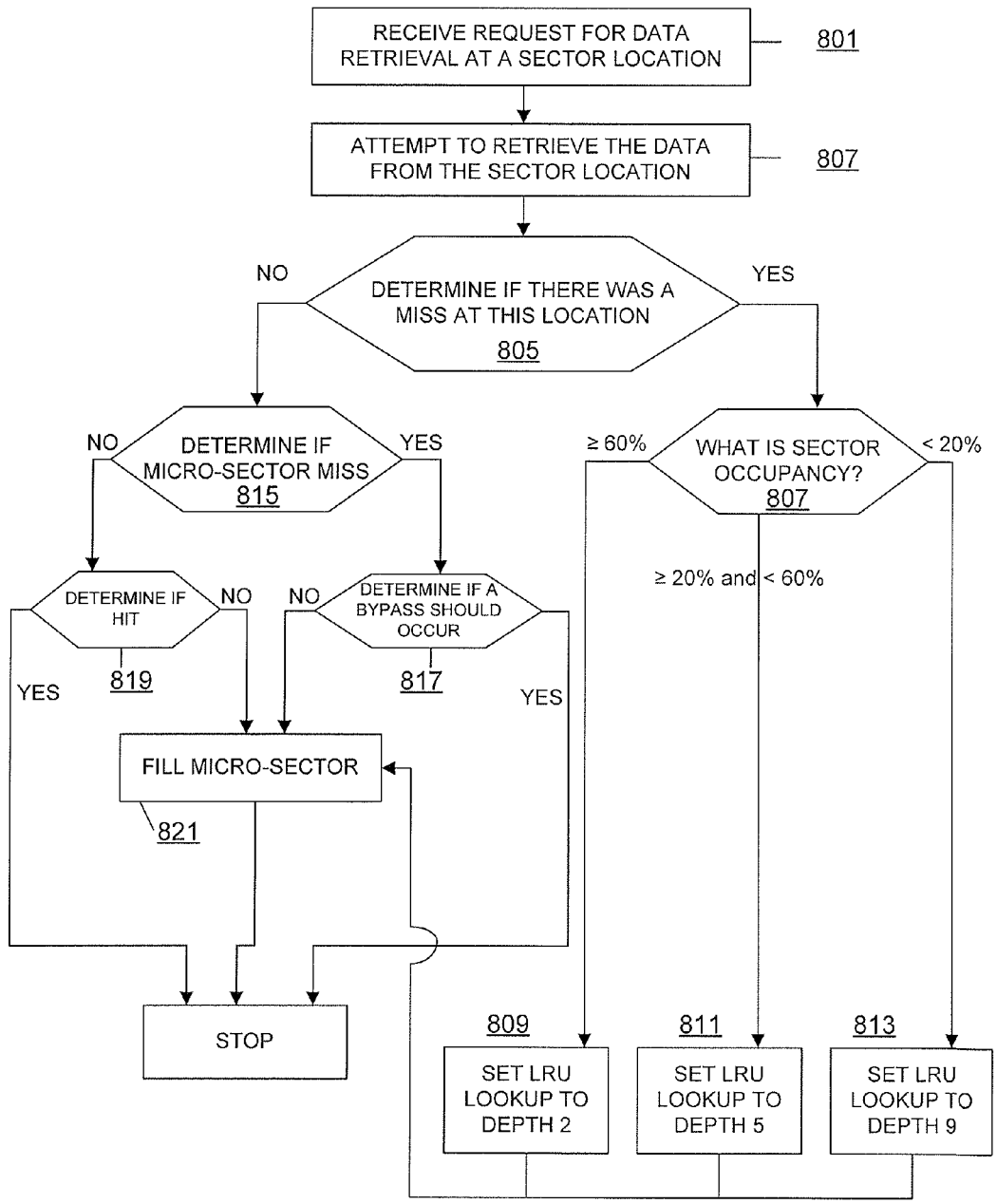
FIG. 8 illustrates an embodiment of a flow for handling sector hits and misses in a sectored DRAM cache.

FIG. 8 illustrates an embodiment of a flow for handling sector hits and misses in a sectored DRAM cache. In essence, this flow implements a random replacement among the partner micro-sectors. This flow is typically executed by a memory controller either in a core or in a central location accessible to the cores.

At 801, a request is received for data retrieval stored at a cache line of a sector. For example, a thread may request for data to be retrieved from a cache line (a particular location) of a sector of a plurality of micro-sectors. In some embodiments, the request includes a physical address of a cache line and in other embodiments the request includes a virtual address of a cache line.

At 803, an attempt to retrieve the data of the requested cache line is made. In some embodiments, one or more actions are performed to allow for this attempt such as a determination of which set that the address maps to is made. Typically, this set is determined from the physical address.

At 805, a determination of if there was a miss at the sector location is made. There are two types of misses in a sectored cache. A first type involves a sector miss meaning that a new sector tag should be allocated. In this case, a global NRU replacement policy is used for selecting the victim sector and all the cache blocks belonging to the victim sector are replaced from the host physical sector frame. The requested cache block is filled into any of the unoccupied cache block positions in the physical sector frame (at least one position would be unoccupied due to replacement of the cache blocks belonging to the victim sector).

If there is a miss (and therefore the cache line does not have the correct data), then the NRU is set to a different depth. Physical sector ways in a set are ordered from NRU to non-NRU. Within each visited physical sector way, the current utilization of the non-NRU sector between the two multiplexed sectors is examined. The chosen NRU multiple sector (the victim sector) is the one whose partner has the minimum current sector utilization among the depth d visited physical sector ways. In short, the search depth d is a function of the utilization of the sector being filled currently.

In the illustrated embodiment, the NRU depth is set dependent upon the sector occupancy determined at 807. Sector occupancy is the average number of valid lines in a sector upon eviction. As the sector size is increased and the cache size kept constant, sector occupancy drops. In some embodiments, the sector occupancy is kept by each thread. In those embodiments, keeping a record of the sector occupancy requires remembering the identification of the thread the filled the sector so that when the sector is evicted, the owner thread's sector utilization can be updated with the utilization of the evicted sector. Each physical sector way needs two thread ids corresponding to the two multiplexed sectors. Typically, the thread ids of only a few sampled sets of the DRAM cache are kept in a separate on-die SRAM structure.

In this example, when the sector occupancy is: 1) greater than or equal to 60% then the NRU depth is set to 2 at 809; 2) greater than or equal to 20% and less than 60%, then the NRU depth is set to 5 at 811; and 3) less than or equal to 20%, then the NRU depth is set to 9 at 813. Of course, these are merely exemplary depths and percentages.

After the NRU is set, the micro-sector is filled from memory (DRAM, etc.) at 821.

The second type of sectored cache miss involves a sector hit, but a micro-sector miss. When there is no miss in the sector at 805, a determination of if there was a micro-sector miss is made at 815. In this case, the requested micro-sector needs to be filled into the physical sector frame on which the accessed sector is mapped. If the physical sector frame has any unoccupied micro-sector position, the requested block is filled into that position; otherwise among the partner micro-sectors residing in the physical sector frame, a random micro-sector is replaced and the requested cache block is filled into this position.

If there is a miss in the micro-sector, then a determination of if micro-sector fill bypass should occur is made at 817. Thrashes continue to happen even after the pairing of virtual sectors in given way. The DRAM cache continues to victimize a random micro-sector of the partner sector when allocating a new micro-sector. A simple hit rate-based micro-sector bypass mechanism is used to further reduce thrashing. When allocating a micro-sector, if all micro-sector positions are occupied in the physical sector, the average hit rate of the thread causing this allocation is looked up. When this hit rate is below a threshold, the micro-sector is not allocated (and thereby bypassed) in the DRAM cache. When the hit rate is above the threshold, then the micro-sector is filled at 821.

If there is not a miss in the micro-sector, a determination of if there is a hit in a cache line or not at 819. If there is not a hit, the micro-sector is filled at 821. If there is a hit, then the flow stops.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
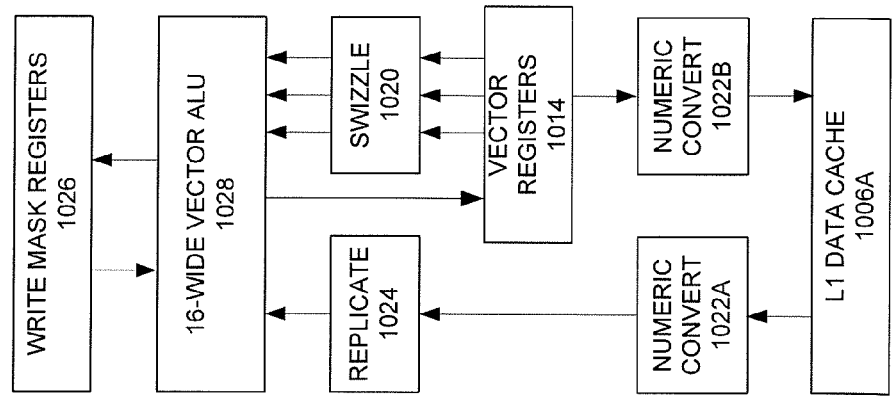
FIGS. 10A-B illustrate a block diagram of a more specific exemplary in-order core architecture.
Figure 10A:
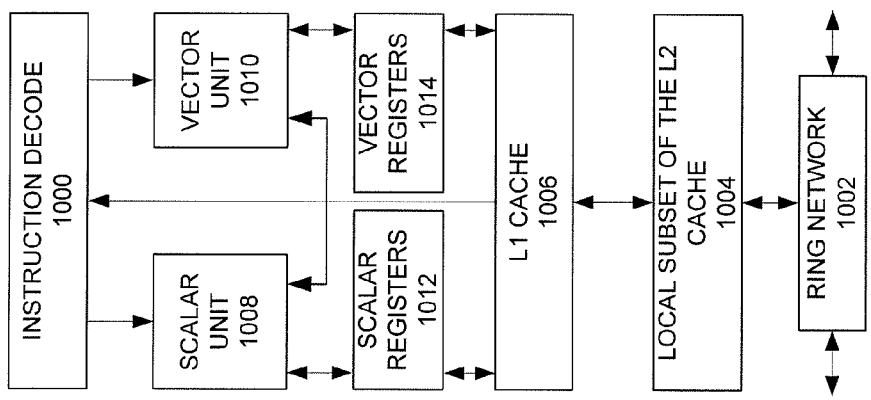

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
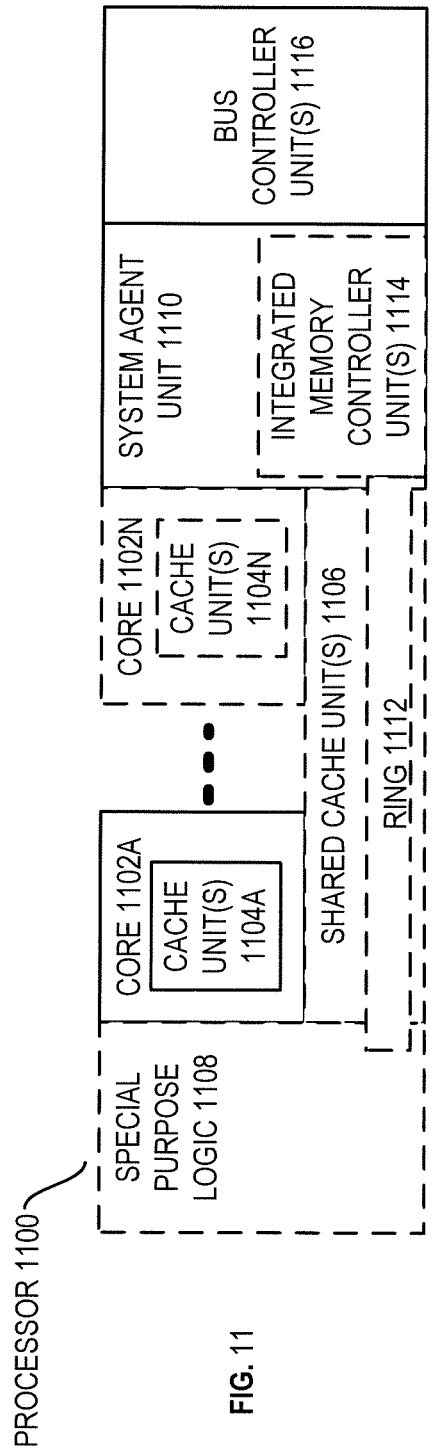
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
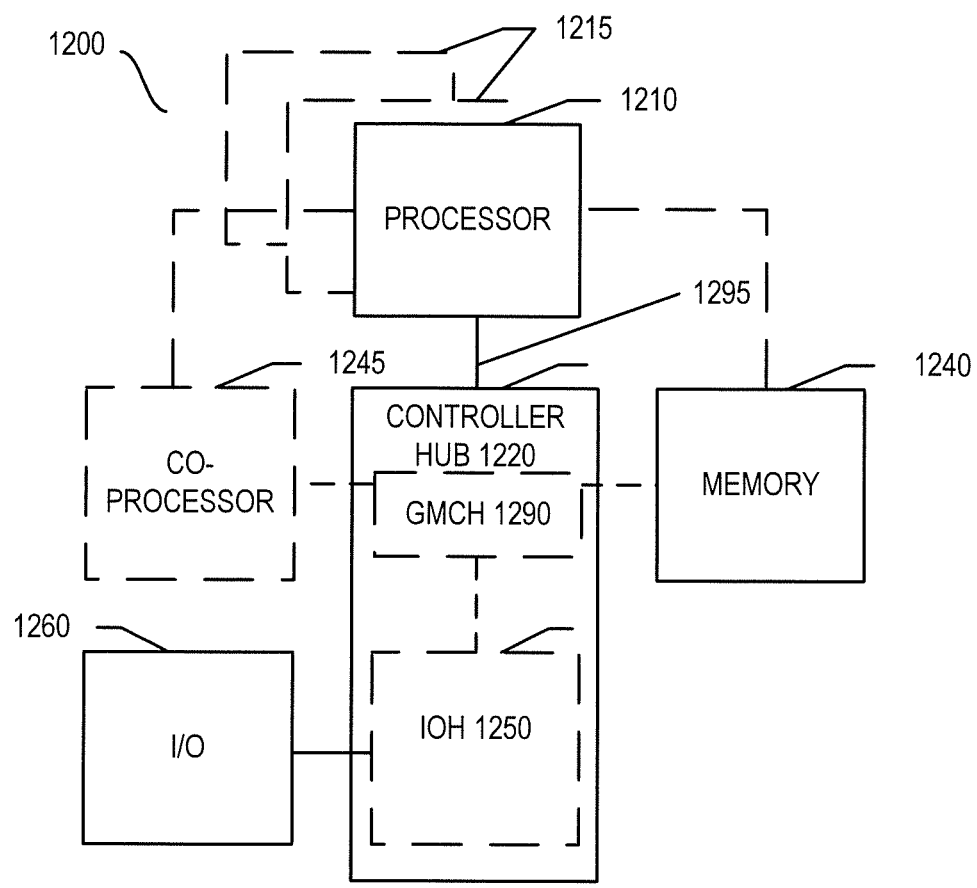
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
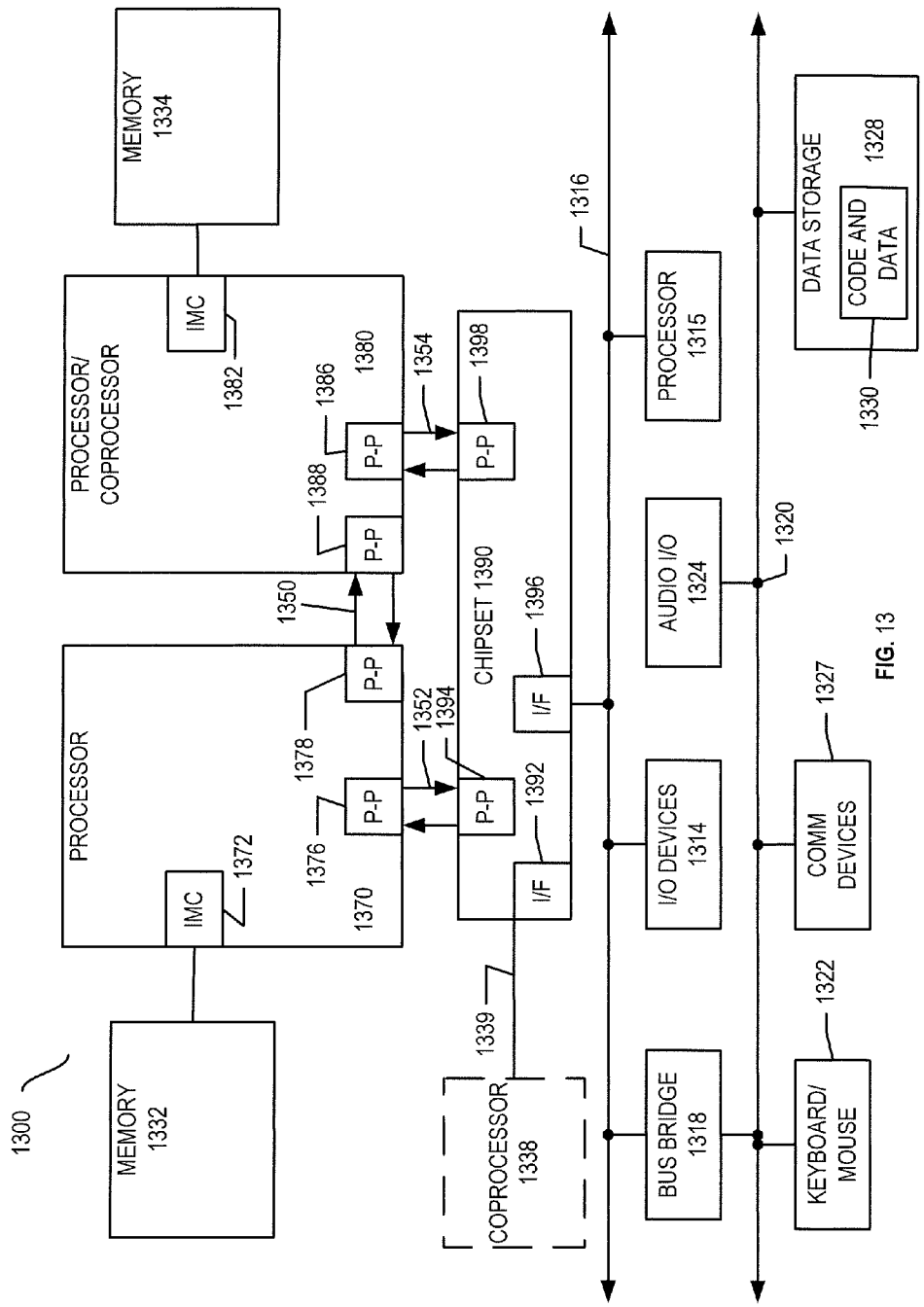

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
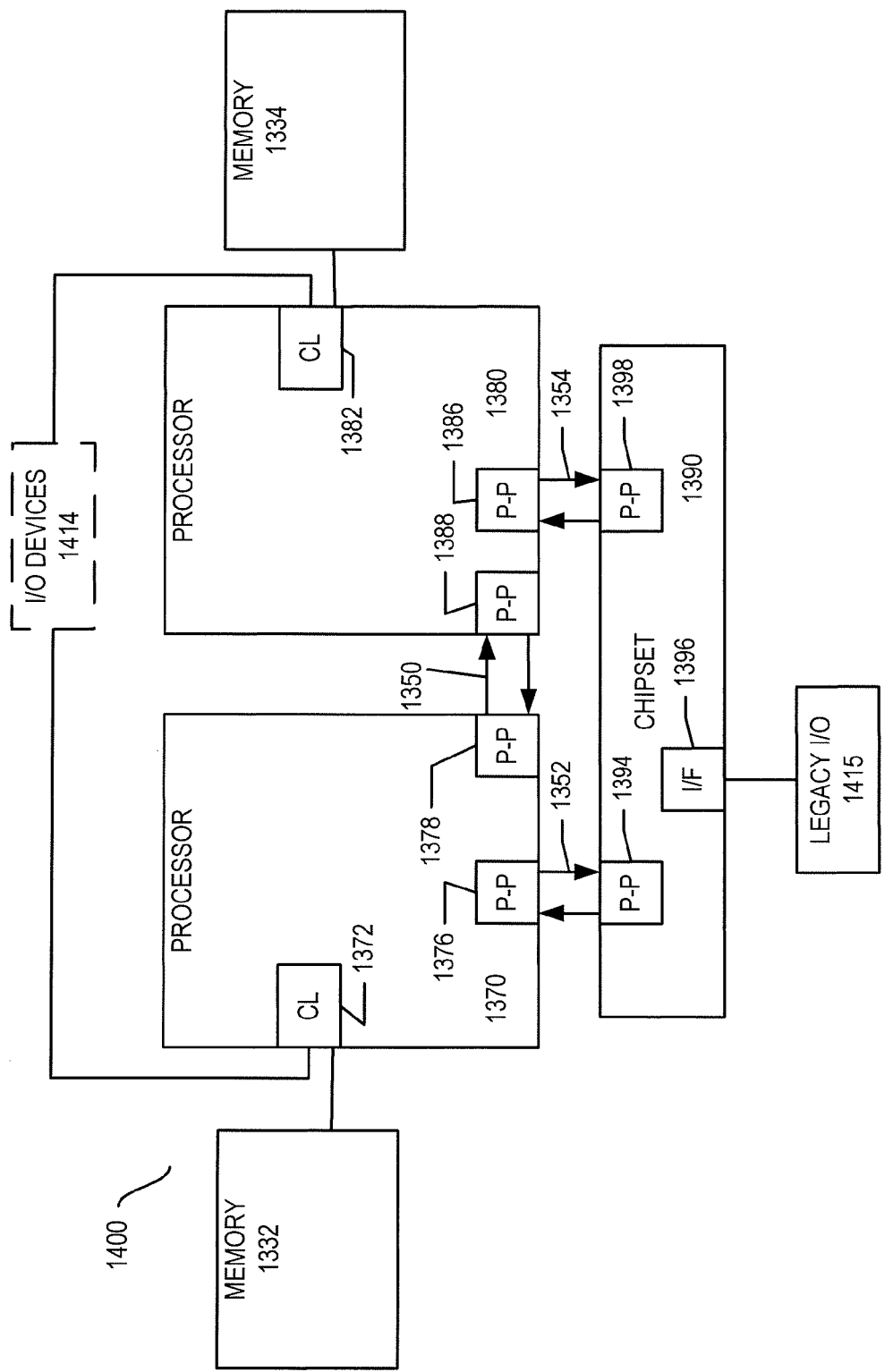

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
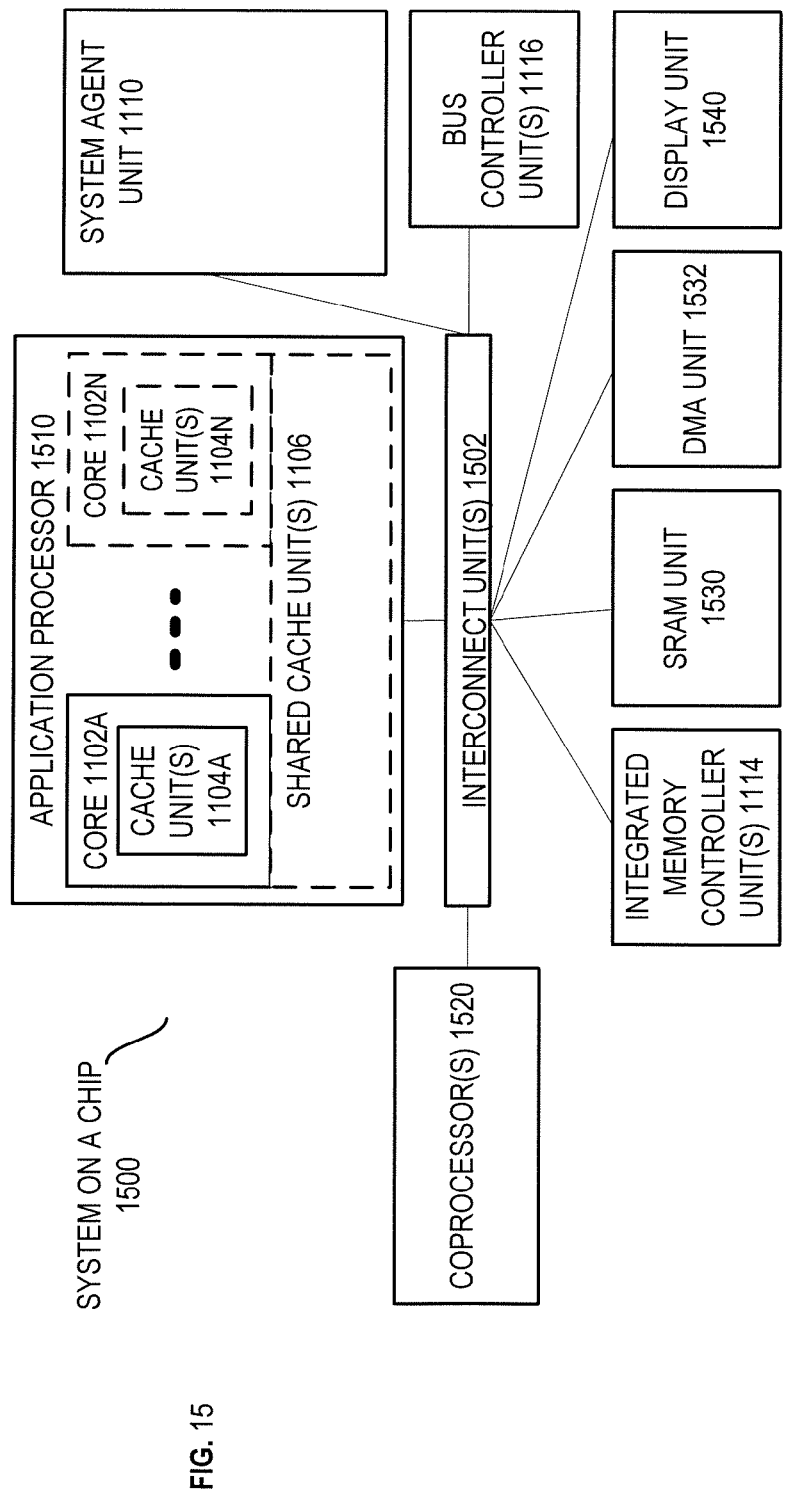

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
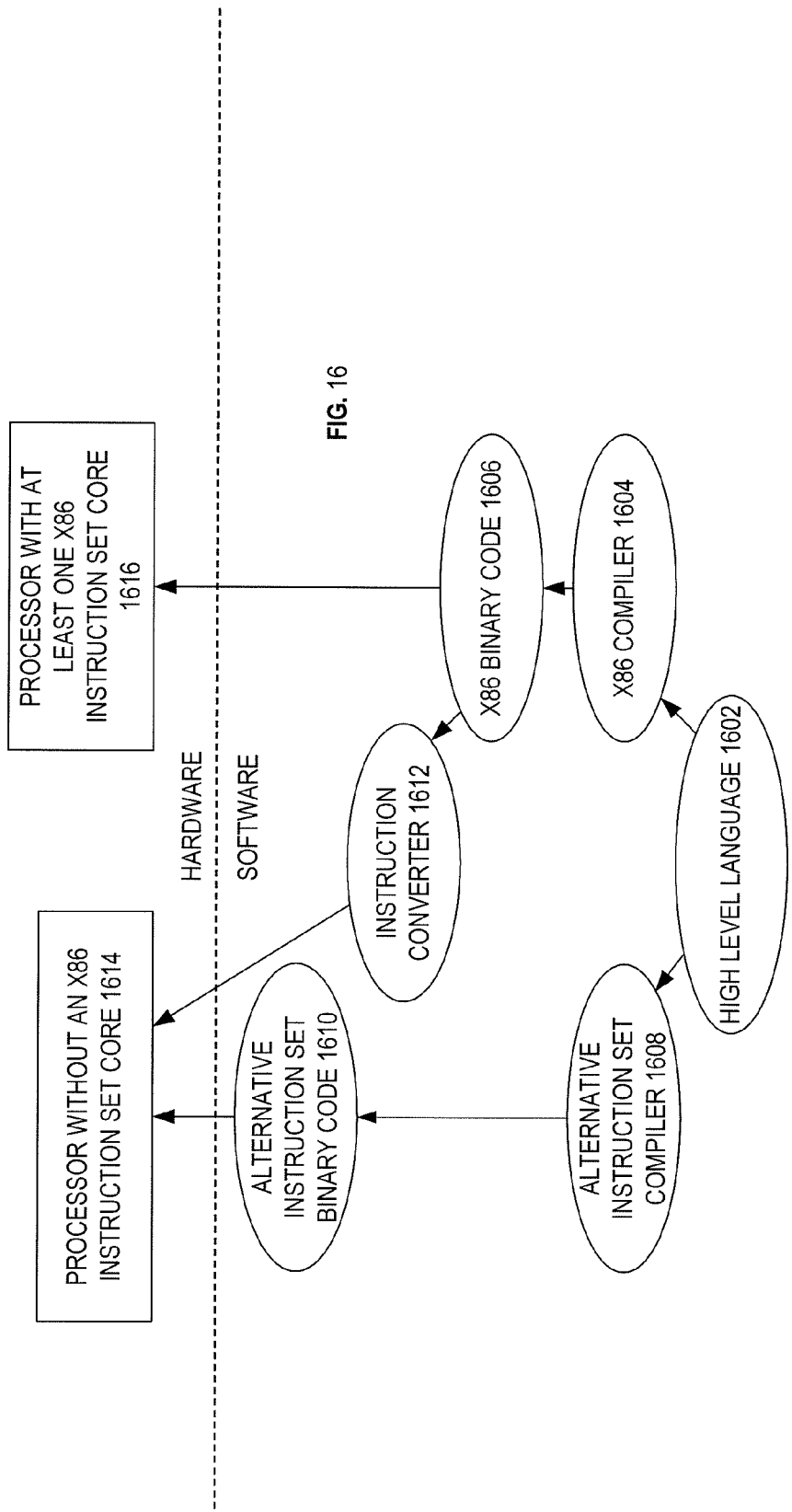
FIG. 16 is a block diagram contrasting the use of a software instruction converter to convert binary instructions in a source instruction set to binary instructions in a target instruction set according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

We claim:

1. An apparatus comprising:
   at least one hardware processor core;
   a sectored dynamic random access memory (DRAM) cache coupled to the at least one hardware processor core, the sectored DRAM cache including a plurality of micro-sectors assignable to threads to be executed by the at least one hardware processor core, wherein each of the plurality of micro-sectors is a continuous region of a sector comprising one or more consecutive cache blocks; and
   storage for at least one tag per sector to be used in addressing a micro-sector and a not recently used indicator per tag, wherein each tag is log 2(N) bits in size where N is a number of micro-sectors in a sector; and
   a memory controller to
      receive a request for data at a sector location;
      determine when there is a miss at the sector location;
      when there is a miss at the sector location,
         determine the sector occupancy,
         set a least recently used lookup depth based on the determined sector occupancy, and
         fill a micro-sector based on the set least recently used lookup depth; and
      when there is not a miss at the sector location,
         determine when there is a micro-sector miss,
            when there is not a micro-sector miss, and there is a hit, the micro-sector is filled, and
            when there is a micro-sector miss, fill the micro-sector.

2. The apparatus of claim 1, wherein the DRAM cache is an L4 cache.

3. The apparatus of claim 1, wherein the DRAM cache is shared with a graphics core.

4. The apparatus of claim 1, wherein a physical sector of a DRAM cache page to include a plurality of micro-sectors.

5. The apparatus of claim 1, wherein a micro-sector cache block to include data, valid, and dirty information.

6. The apparatus of claim 1, further comprising:
   a memory controller in the at least one processor core to access the DRAM cache.

7. The apparatus of claim 1, further comprising:
   a memory controller external to the at least one processor core to access the DRAM cache and accessible by all of the processor cores.

8. The apparatus of claim 1, further comprising:
   storage for a not-recently used bit per sector.

9. The apparatus of claim 1, wherein each bit position in the tag indicates which micro-sectors belong to a physical sector and a relative position within the physical sector.

10. A method implemented in a memory controller, the method comprising:
    receiving a request for data at a sector location;
    determining when there is a miss at the sector location;
    when there is a miss at the sector location,
       determining the sector occupancy,
       setting a least recently used lookup depth based on the determined sector occupancy, and
       filling a micro-sector based on the set least recently used lookup depth; and
    when there is not a miss at the sector location,
       determining when there is a micro-sector miss,
          when there is not a micro-sector miss, and there is a hit, the micro-sector is filled, and
          when there is a micro-sector miss, filling the micro-sector.

11. The method of claim 10, wherein the sector occupancy is less than 20%.

12. The method of claim 11, wherein the least recently used lookup depth is 2.

13. The method of claim 11, wherein the least recently used lookup depth is 5.

14. The method of claim 11, wherein the least recently used lookup depth is 9.

15. The method of claim 10, further comprising:
   determining that a micro-sector bypass should occur and not filling the micro-sector.

16. The method of claim 10, wherein the sector occupancy is between 20% and less than 60%.

17. The method of claim 10, wherein the sector occupancy is greater than or equal to 60%.

* * * * *